US012460466B2

(12) United States Patent
Ward, Jr.

(10) Patent No.: US 12,460,466 B2
(45) Date of Patent: Nov. 4, 2025

(54) PORTABLE WINDOW CONTROLLERS AND ASSOCIATED METHODS

(71) Applicant: Toyota Motor Engineering & Manufacturing North America, Inc., Plano, TX (US)

(72) Inventor: Clinton Jay Ward, Jr., Evansville, IN (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 491 days.

(21) Appl. No.: 17/572,986

(22) Filed: Jan. 11, 2022

(65) Prior Publication Data

US 2023/0220720 A1    Jul. 13, 2023

(51) Int. Cl.
*E05F 15/695*        (2015.01)
*G01R 31/3835*       (2019.01)

(52) U.S. Cl.
CPC ........ *E05F 15/695* (2015.01); *G01R 31/3835* (2019.01); *E05Y 2201/434* (2013.01); *E05Y 2400/415* (2013.01); *E05Y 2400/85* (2013.01); *E05Y 2800/692* (2013.01); *E05Y 2900/55* (2013.01)

(58) Field of Classification Search
CPC .................................................... E05F 15/695
See application file for complete search history.

(56) References Cited

U.S. PATENT DOCUMENTS

| | | | |
|---|---|---|---|
| 6,388,221 B1* | 5/2002 | Rudolph | H01H 23/04 200/339 |
| 8,851,141 B2 | 10/2014 | Blair et al. | |
| 10,427,504 B2 | 10/2019 | Mueller et al. | |
| 2017/0314302 A1* | 11/2017 | Marlia | E05B 81/56 |
| 2017/0350183 A1* | 12/2017 | Diaz | B60H 1/00657 |

FOREIGN PATENT DOCUMENTS

| | | |
|---|---|---|
| CN | 105332586 B | 7/2017 |
| CN | 209553115 U | 10/2019 |
| CN | 211201538 U | 8/2020 |
| JP | 4285393 B2 | 6/2009 |

* cited by examiner

*Primary Examiner* — Daniel Kessie
(74) *Attorney, Agent, or Firm* — Dinsmore & Shohl LLP

(57) ABSTRACT

A portable window controller for operating window lift assemblies of multiple vehicles includes a controller housing that is sized to fit in a hand and a control switch that extends outward from the housing and can be actuated by the hand. The control switch is a momentary switch that is biased toward a home position and terminates power to a regulator motor when the control switch is placed in the home position.

15 Claims, 3 Drawing Sheets

PORTABLE WINDOW CONTROLLERS AND ASSOCIATED METHODS

TECHNICAL FIELD

The present specification generally relates to window controllers for motorized windows and, more particularly, to window controllers that are portable and can be carried between vehicles.

BACKGROUND

Window lift assemblies are often used in vehicles for raising and lowering of windows between open and closed positions using an actuator, such as a motor. Window regulators for use in automobiles often include a link mechanism or wire mechanism mounted in a door and coupled to a bracket fixed to a panel of window glass attached the door. When raising or lowering the window glass, the link mechanism or wire is moved by a motor-driven actuator to impart vertical movement to the bracket and the window glass connected thereto.

Sometimes during vehicle assembly, there may be an issue with the operation of a window lift assembly. It may be desirable to troubleshoot the window lift assembly. However, the window lift assembly may not yet be inside the vehicle or inside the vehicle, but not yet wired to controls and/or a battery.

Accordingly, a need exists for portable window controllers that can be used to operate window lift assemblies and actuate their associated window regulators.

SUMMARY

In one embodiment, a portable window controller for operating window lift assemblies of multiple vehicles includes a controller housing that is sized to fit in a hand and a control switch that extends outward from the housing and can be actuated by the hand. The control switch is a momentary switch that is biased toward a home position and terminates power to a regulator motor when the control switch is placed in the home position.

In another embodiment, a method of operating a window regulator assembly is provided. The method includes actuating a control switch of a portable window controller that is electrically connected to a regulator motor of the window regulator assembly. The actuation of the control switch moves a regulator carriage of a regulator in a first direction. The control switch is released. The control switch is biased toward a home position. Power to the regulator motor is automatically terminated when the control switch returns to the home position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to portable window controllers that are used to operate window lift assemblies of multiple vehicles. The portable window controllers include a controller housing that is sized to fit in a hand and a control switch that extends outward from the housing and can be actuated by the hand. The control switch may be a momentary switch that is biased toward a home OFF position. The control switch automatically cuts power to a regulator motor when the control switch is placed in the home position, either manually or by the bias provided by a biasing member, such as a spring.

Figure 1:
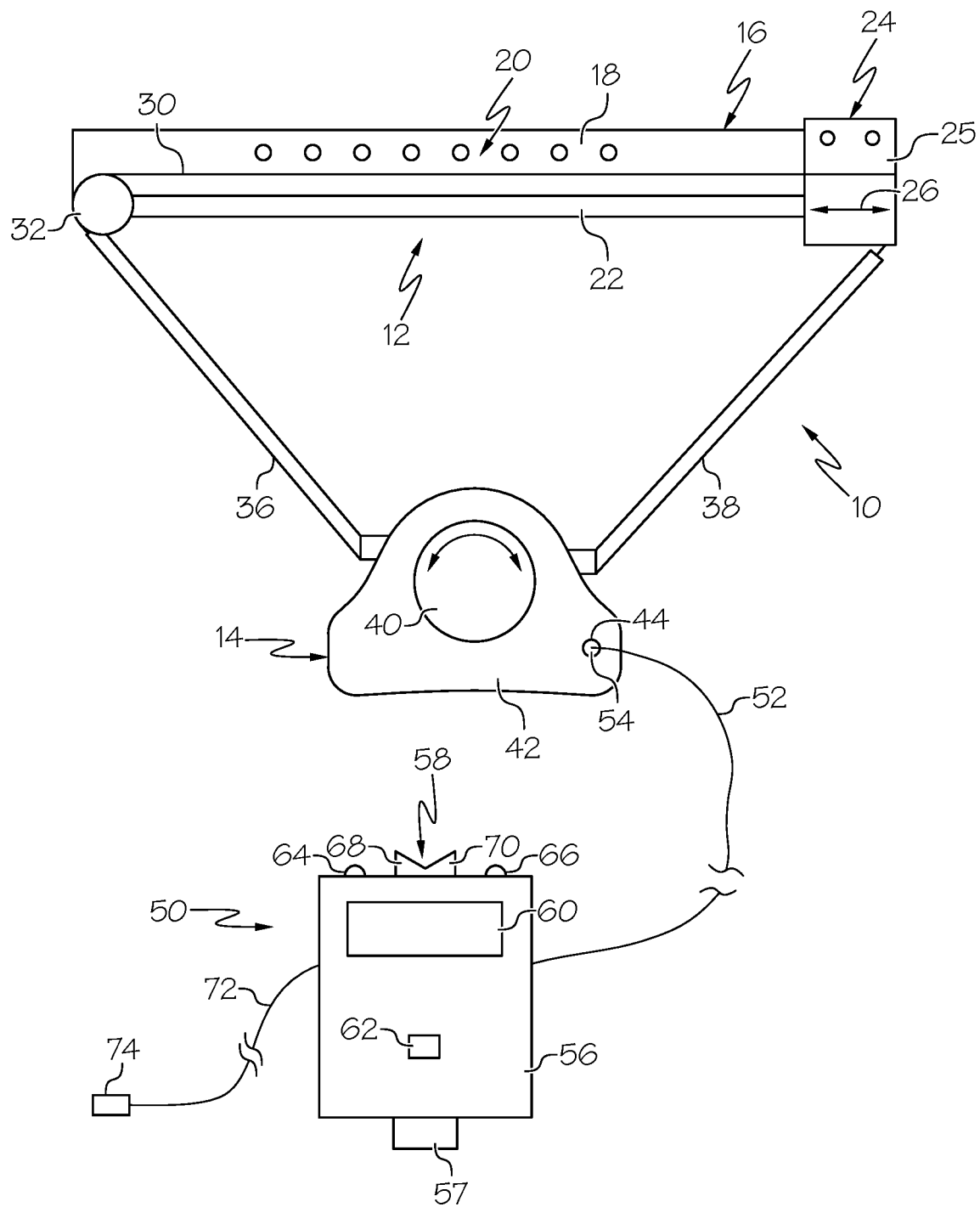
FIG. 1 is a schematic view of a portable window controller connected to a window lift assembly, according to one or more embodiments described herein.

Referring to FIG. 1, a window lift assembly 10 includes a window regulator assembly 12. The window regulator assembly 12 includes a motor 14 and a regulator 16. In the illustrated example, the regulator 16 is a cable-driven regulator; however, the regulator may be any suitable regulator type, such as a scissor-driven regulator. The regulator 16 includes a regulator track member 18 that includes a mounting portion 20 and a linear regulator track 22 that extends outward from the mounting portion 20 forming an L-shape. When mounted in a vehicle door (e.g., to an inner panel of the vehicle door), the regulator track 22 extends outward in a vehicle lateral direction. A regulator carriage 24 slides along the regulator track 22 during operation. In some embodiments, the regulator track member 18 is mounted in the door such that a sliding direction, represented by arrows 26, is oriented in a vehicle vertical direction. Thus, sliding movement of the regulator carriage 24 raises and lowers a vehicle window mounted thereto. For example, the regulator carriage 24 may include a window mounting structure 25 that can be mounted to the vehicle window such that the regulator carriage 24 carries the vehicle window.

A regulator cable 30 is connected to the regulator carriage 24. The regulator cable 30 slides around end pulleys 32. A regulator motor 34 moves the regulator cable 30 back and forth. The regulator cable 30 extends through protective sleeves 36 and 38 and is operatively connected to a drive mechanism 40 (e.g., a wheel) that is driven by the regulator motor 34. The regulator motor 34 also includes a motor housing 42 and an input 44 where power and a controller can be connected to regulator motor 34 for controlling the regulator motor 34.

A portable window controller 50 is connected to the input 44 by one or more cables 52 and a releasable connector, represented by element 54. The portable window controller 50 includes a controller housing 56 that is sized to fit in one's hand. A clip 57 or other suitable fastening device may be used to carry the portable window controller 50. A control switch 58 extends outward from the controller housing 56 and is accessible to be actuated by hand. The control switch 58 may be a momentary switch that is biased toward a home OFF position, as illustrated by FIG. 1. The control switch 58 automatically cuts power to the regulator motor 34 when the control switch 58 is placed in the home position, either manually or by the bias provided by a biasing member, such as a spring.

A display 60 is mounted to the controller housing 56. The display 60 may be any suitable type, such as an LED display. The display 60 may be connected to a power measuring module, represented by element 62 that can measure power properties, such as voltage, current, etc. (e.g., a Volt meter) of power coming into the portable window controller 50. Indicator lights 64 and 66 is also provided that can be located adjacent opposite sides 68 and 70 of the control switch 58. The indicator lights 64 and 66 may illuminate different colors to provide a visual indication of operation of the portable window controller 50, as will be described in greater detail below.

The portable window controller 50 connects to an external battery using one or more cables 72. Another releasable connector 74 is provided for connecting to a corresponding connection of the battery. The display 60 can display a power property of the battery during operation, such as a voltage. The display 60 can be used to determine an operating condition of the battery to readily see when the battery may need to be replaced. Once the portable window controller 50 is connected to both the regulator motor 34 and the battery, the portable window controller 50 can be used to operate the window regulator assembly 12.

Figure 2:
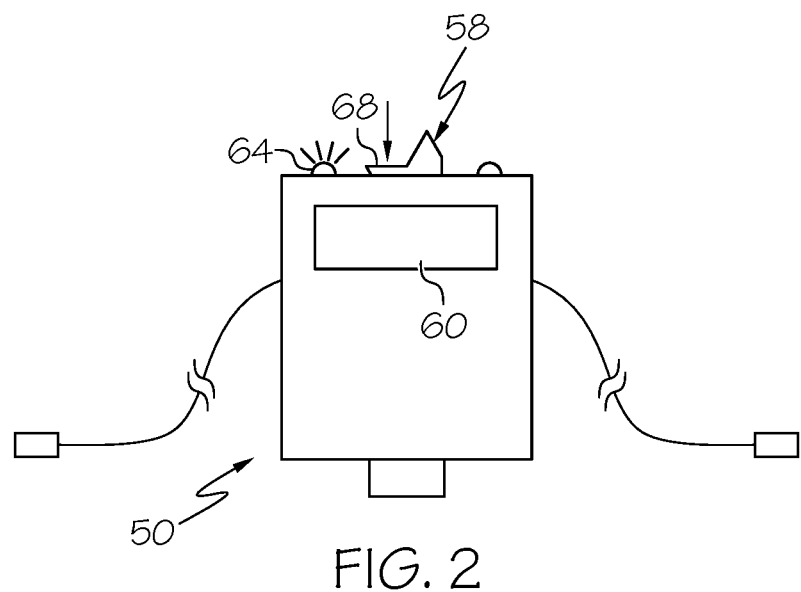
FIG. 2 is a schematic view of the portable window controller of FIG. 1 in operation, according to one or more embodiments shown and described herein.
Figure 3:
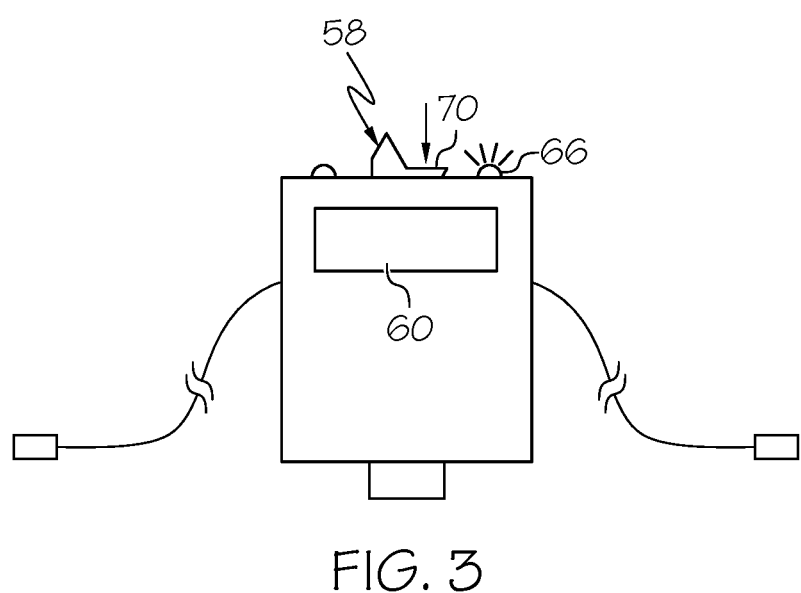
FIG. 3 is a schematic view of the portable window controller of FIG. 1 in operation, according to one or more embodiments shown and described herein.
Figure 4:
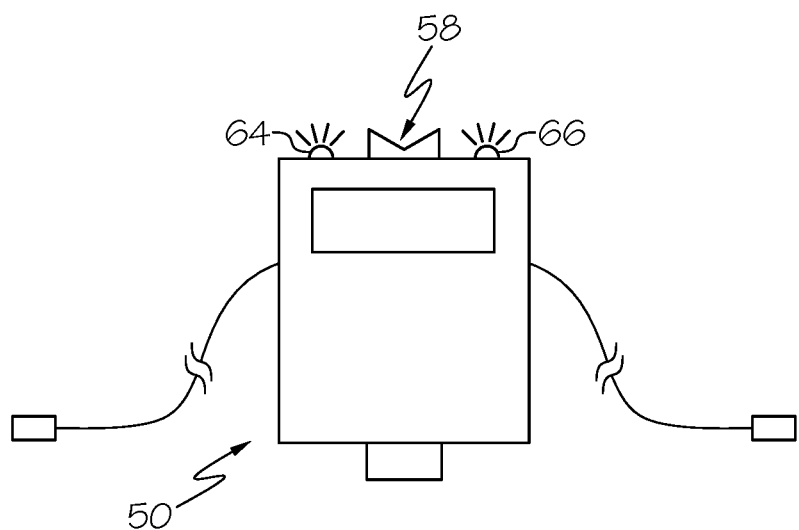
FIG. 4 is a schematic view of the portable window controller of FIG. 1 in operation, according to one or more embodiments shown and described herein

Referring now to FIGS. 2-4, a method of operating the window regulator assembly 12 is illustrated. Referring to FIG. 2, in order to move the regulator carriage 24 and window connected thereto in a first direction (e.g., up), one side 68 of the control switch 58 is actuated. In the illustrated example, the side 68 of the control switch 58 is pushed down manually. Because the control switch 58 may be a momentary switch, the side 68 is held down manually and then returns to the home position when released as shown by FIG. 1. Further, the light 64 is illuminated when the side 68 is held down manually to provide a visual indication that the portable window controller 50 is operating. Additionally, the display 60 shows a power property of the battery connected to the portable window controller 50 and used to operate the regulator motor 34.

Referring to FIG. 3, in order to move the regulator carriage 24 and window connected thereto in a second direction opposite the first direction (e.g., down), the other side 70 of the control switch 58 is actuated by pushing down manually. Again, the side 70 is held down manually and then returns to the home position when released as shown by FIG. 1. Further, the light 66 is illuminated when the side 70 is held down manually to provide a visual indication that the portable window controller 50 is operating. Additionally, the display 60 shows a power property of the battery connected to the portable window controller 50 and used to operate the regulator motor 34.

Referring to FIG. 4, the control switch 58 automatically returns to the home position when released. The control switch 58 cuts power to a regulator motor when the control switch is in the home position. Such a switching arrangement can inhibit overloading of the regulator motor 34. Both lights 64 and 66 may illuminate when the portable window controller 50 is plugged into the regulator motor 34 and connected to the battery to show a fully energized state.

The above-described portable window controllers provide a personal controller for operating window lift assemblies. The portable window controllers can be connected to regulator motors of different vehicles in order to troubleshoot an issue by operating the window lift assemblies. The portable window controllers can be light and small enough to carry by hand or be carried on a belt or belt loop for easy access. The portable window controllers may include a display connected to a power measurement module for measuring voltage or other power property and then displaying the measurement value. The personal window controllers may be operating using a momentary switch that automatically cuts power to the regulator motor when in the home position.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A portable window controller for operating a window lift assembly of a vehicle, the portable window controller comprising:
    a controller housing that is sized to fit in a hand;
    a control switch that extends outward from the housing and can be actuated by the hand;
    a first cable connected to the controller housing that is configured to connect to a regulator motor inside a door of the vehicle and not wired to a vehicle battery with the controller housing outside the door; and
    a second cable connected to the controller housing that is configured to connect to an external power source that is external to the vehicle such that the portable window controller is configured to operate the regulator motor independently of a battery of the vehicle;
    wherein the control switch is a momentary switch that is biased toward a home position and terminates power to the regulator motor when the control switch is placed in the home position;
    wherein, in operation, the portable window controller configured to actuate the window regulator in a first direction when a first side of the control switch is actuated from the home position to a first actuated position, the portable window control configured to actuate the window regulator in an opposite second direction when an opposite second side of the control switch is actuated from the home position to a second actuated position.

2. The portable window controller of claim 1 further comprising a power measurement module configured to measure a power property of a battery.

3. The portable window controller of claim 2 further comprising a display configured to display the power property.

4. The portable window controller of claim 3, wherein the power property is a voltage.

5. The portable window controller of claim 1 further comprising the first cable and a connector that is connected to the first cable that is configured to electrically connect the regulator motor to the portable window controller.

6. The portable window controller of claim 1 further comprising a clip that is connected to the controller housing.

7. The portable window controller of claim 1 further comprising a light that illuminates when the control switch is actuated.

8. A method of operating a window lift assembly of a vehicle, the method comprising:
    connecting a first cable connected to a portable window controller to a regulator motor of a window regulator assembly located inside a door of the vehicle and not wired to a vehicle battery with the controller housing outside the door;

connecting a second cable connected to the portable window controller to an external power source that is external to the vehicle such that the portable window controller is configured to operate the regulator motor independently of a battery of the vehicle;

actuating a control switch of the portable window controller that is electrically connected to the regulator motor of the window regulator assembly by the first cable, therein actuation of the control switch moves a regulator carriage of the window regulator assembly in a first direction;

releasing the control switch, the control switch being biased toward a home position; and automatically terminating power to the regulator motor when the control switch returns to the home position;

wherein, in operation, the portable window controller actuating the window regulator in a first direction when a first side of the control switch is actuated from the home position to a first actuated position, the portable window control actuating the window regulator in an opposite second direction when an opposite second side of the control switch is actuated from the home position to a second actuated position.

9. The method of claim 8, wherein the control switch is a momentary switch.

10. The method of claim 8 further comprising measuring a power property of a battery electrically connected to the portable window controller using a power measurement module.

11. The method of claim 10 further comprising displaying the power property on a display.

12. The method of claim 11, wherein the power property is a voltage.

13. The method of claim 8 further comprising connecting a connector of the first cable of the portable window controller to the regulator motor.

14. The method of claim 8 further comprising a clip that is connected to the controller housing.

15. The method of claim 8 further comprising illuminating a light when the control switch is actuated.

* * * * *